United States Patent
Lafleche et al.

(10) Patent No.: US 11,958,964 B2
(45) Date of Patent: *Apr. 16, 2024

(54) PATIENT SUPPORT FORMED FROM AN ELASTOMERIC COMPOSITION INCLUDING A POLYMER BLEND OF SEEPS COPOLYMERS

(71) Applicant: Stryker Corporation, Kalamazoo, MI (US)

(72) Inventors: Patrick Lafleche, Kalamazoo, MI (US); James K. Galer, Byron Center, MI (US); Matthew Ward, Farmington Hills, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,805

(22) Filed: Dec. 22, 2022

(65) Prior Publication Data

US 2023/0130792 A1 Apr. 27, 2023

Related U.S. Application Data

(63) Continuation of application No. 16/705,883, filed on Dec. 6, 2019, now Pat. No. 11,560,471.

(60) Provisional application No. 62/777,911, filed on Dec. 11, 2018.

(51) Int. Cl.
*A47C 27/06* (2006.01)
*A61G 7/065* (2006.01)
*C08L 25/08* (2006.01)

(52) U.S. Cl.
CPC .............. *C08L 25/08* (2013.01); *A47C 27/06* (2013.01); *A61G 7/065* (2013.01); *C08L 2203/02* (2013.01); *C08L 2205/025* (2013.01)

(58) Field of Classification Search
CPC ......... A61G 7/065; A47C 27/06; C08L 53/02; C08L 53/025; C08L 205/025
See application file for complete search history.

(56) References Cited

U.S. PATENT DOCUMENTS

| | | | |
|---|---|---|---|
| 4,665,573 A | 5/1987 | Fiore | |
| 5,007,124 A | 4/1991 | Raburn et al. | |
| 5,179,742 A | 1/1993 | Oberle | |
| 5,749,111 A | 5/1998 | Pearce | |
| 5,994,450 A | 11/1999 | Pearce | |
| 6,026,527 A | 2/2000 | Pearce | |
| 6,115,861 A | 9/2000 | Reeder et al. | |
| 6,413,458 B1 | 7/2002 | Pearce | |
| 6,797,765 B2 | 9/2004 | Pearce | |
| 6,835,015 B2 | 12/2004 | Pearce | |
| 6,865,759 B2 | 3/2005 | Pearce | |
| 7,060,213 B2 | 6/2006 | Pearce | |
| 7,076,822 B2 | 7/2006 | Pearce | |
| 7,666,341 B2 | 2/2010 | Pearce | |
| 7,886,386 B2 | 2/2011 | Balonick et al. | |
| 7,964,664 B2 | 6/2011 | Pearce | |
| 8,069,514 B2 | 12/2011 | Poulos et al. | |
| 8,490,233 B2 | 7/2013 | Essers | |
| 2003/0092826 A1 | 5/2003 | Pearce | |
| 2010/0212087 A1 | 8/2010 | Leib et al. | |
| 2012/0060295 A1 | 3/2012 | Flick et al. | |
| 2013/0061396 A1 | 3/2013 | Lafleche et al. | |
| 2020/0181384 A1 | 6/2020 | Lafleche et al. | |

FOREIGN PATENT DOCUMENTS

| | | |
|---|---|---|
| GB | 2405582 A | 3/2005 |
| WO | 95007679 A2 | 3/1995 |

OTHER PUBLICATIONS

Everspring Chemical, "Everfos—168 Technical Data Sheet", 2018, 2 pages.
Everspring Chemical, "Evernox—10; Evernox—10GF Technical Data Sheet", 2018, 2 pages.
Kuraray, "Prospector Septon 4044 Technical Data Sheet", Mar. 21, 2018, 2 pages.
Kuraray, "Prospector Septon 4055 Technical Data Sheet", Mar. 21, 2018, 2 pages.
Kuraray, "Septon 4033, 4044, 4055, 4077 Safety Data Sheet", Version 05, May 19, 2015, 7 pages.
Kuraray, "Septon 4033, 4044, 4055, 4077, 4099 Safety Data Sheet", Revised Feb. 1, 2013, 5 pages.
Kuraray, "Septon and Hybrar Product Information-Chemicals/Elasotomers/Rubber Webpage", https://www.kuraray.com/products/septon, 2021, 13 pages.
Sonneborn, Inc., "Carnation White Mineral Oil Material Safety Data Sheet", Nov. 25, 2008, 8 pages.
Sunchemical, "Sunfast Blue 15:3 Material Safety Data Sheet", Jan. 4, 2011, 6 pages.
Toshiba-Machine, "ECSXII Smart Electric Molding Solutions", Jul. 2017, 28 pages.

*Primary Examiner* — Irina S Zemel
*Assistant Examiner* — Jeffrey S Lenihan
(74) *Attorney, Agent, or Firm* — Howard & Howard Attorneys PLLC

(57) ABSTRACT

This disclosure provides a person support formed from an elastomeric composition. The elastomeric composition includes a polymer blend with the polymer blend consisting essentially of a first and second SEEPS copolymer. The first and second SEEPS copolymers are present in the polymer blend in an amount of from 75 to 95 percent by weight and 5 to 25 percent by weight, respectively, based on the total weight of the polymer blend. In addition, the sum of the first and second SEEPS copolymers in the polymer blend is 100 percent by weight. The first and second SEEPS copolymers have a weight average molecular weight of weight of at least 200,000 and 125,000 to 175,000, respectively. The disclosure also provides a patient support for supporting a patient with the patient support formed from the elastomeric composition.

17 Claims, 9 Drawing Sheets

PATIENT SUPPORT FORMED FROM AN ELASTOMERIC COMPOSITION INCLUDING A POLYMER BLEND OF SEEPS COPOLYMERS

CROSS-REFERENCE TO RELATED APPLICATIONS

The subject patent application is a continuation of U.S. patent application Ser. No. 16/705,883, filed on Dec. 6, 2019, which claims priority to and all the benefits of U.S. Provisional Patent Application No. 62/777,911, filed on Dec. 11, 2018, the disclosures of which are hereby incorporated by reference in their entirety.

BACKGROUND

Many patient supports (e.g., mattresses) are designed to minimize pressure on the body, yet remain inadequate. Ideally, a patient support should provide a nearly uniform pressure plateau over a wide range of displacements that result from patients of varying body weights using the patient support. Instead, many patient supports tend to have an extended elastic response (for lighter weight patients) or densification and bottoming out of the patient support (for heavier weight patients). Both scenarios are undesirable.

A patient support having a new and improved formulation designed to address one or more of the aforementioned deficiencies is desired.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION OF THE EMBODIMENTS

Figure 1:
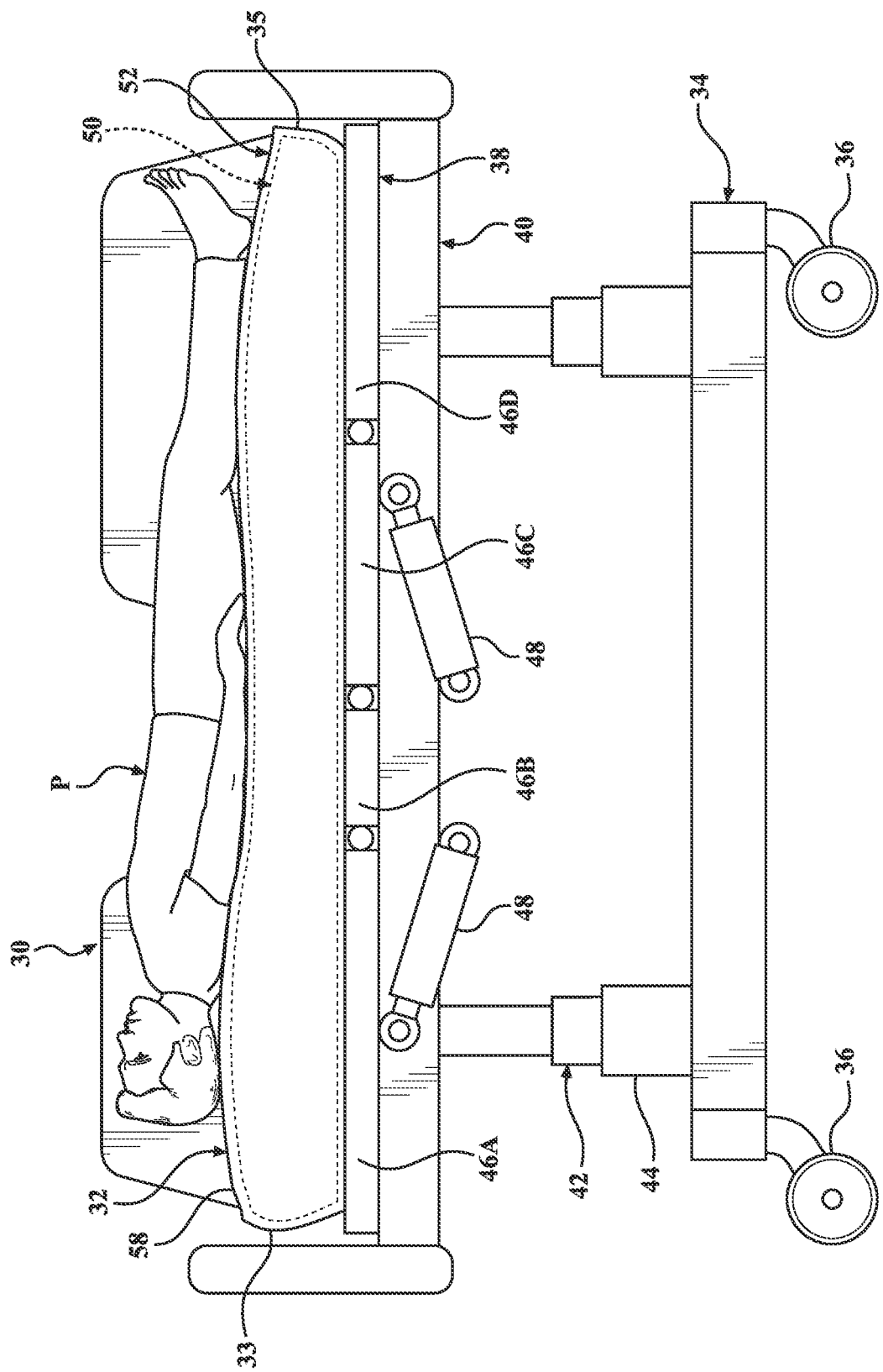
FIG. 1 is an elevational view of a patient support apparatus including a patient support.

The present disclosure provides a patient support formed from an elastomeric composition. As described in detail below, the elastomeric composition is useful for forming cells used in a lattice of cells of the patient support. It should be appreciated, however, that the elastomeric composition is also useful for providing other types of supports, including, supports for persons in non-medical settings (e.g., personal mattresses, automotive seating, furniture, and the like).

The elastomeric composition includes a polymer blend of SEEPS (styrene-[ethylene/ethylene-propylene]-styrene) copolymers. SEEPS copolymers are block copolymers that exhibit rubber-like properties over a broad temperature range. In particular, SEEPS copolymers are formed as the reaction product from a hydrogenated styrene isoprene/butadiene block copolymer or, more particularly, are made from hydrogenated styrene block polymers as endblocks with 2-methyl-1,3-butadiene and 1,3-butadiene below according to formula (I) below:

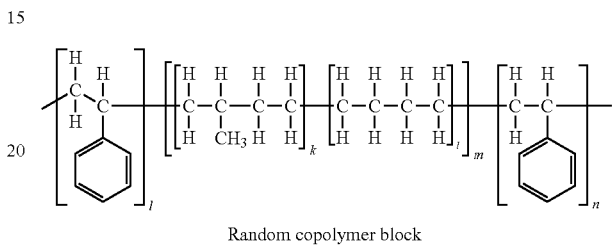

Random copolymer block

The SEEPS copolymers described herein include relative amounts of the harder styrenic blocks (corresponding to the amounts of subscripts 1 and n present in formula (I)) and softer diene blocks (corresponding to the amount of subscript m in formula (I), which is further differentiated by the relative amounts of 2-methyl-1,3-butadiene (i.e., polyisoprene) and 1,3-butadiene according to subscripts k and l).

In certain embodiments, the polymer blend consists essentially of a blend of two SEEPS copolymers, both copolymers in accordance with formula (I) above, but having differing weight average molecular weights as measured via gel permeation chromatography. In further embodiments, the polymer blend consists of a blend of two SEEPS copolymers, both copolymers in accordance with formula (I) above, but having differing weight average molecular weights as measured in grams per mole via gel permeation chromatography. In certain embodiments, the two SEEPS copolymers have an average molecular weight difference of at least 10,000, such as at least 25,000, such as from 75,000 to 200,000.

The first SEEPS copolymer is a high molecular weight SEEPS copolymer having a weight average molecular weight of greater than 200,000; such as from 200,000 to 325,000; such as from 295,000 to 315,000; or such as about 308,000, as measured by gel permeation chromatography. In certain embodiments, in addition to the weight average molecular weight range, this first SEEPS copolymer has a styrenic content of about 30%.

The second SEEPS copolymer is a medium molecular weight SEEPS copolymer having a weight average molecular weight of from 125,000 to 175,000, such as about 150,000, as measured by gel permeation chromatography. In certain embodiments, in addition to the weight average molecular weight range, this second SEEPS copolymer has a styrenic content of about 32%.

In particular, the polymer blend consists essentially of, or alternatively consists of, from 75 to 95 weight percent of the first SEEPS copolymer (i.e., 75 to 95% by weight of the first SEEPS copolymer), and from 5 to 25 weight percent of the second SEEPS copolymer (i.e., from 5 to 25% by weight of the second SEEPS copolymer), for a sum total of 100 weight percent, based on the total weight of the polymer blend. In further embodiments, the polymer blend consists essentially of, or consists of, 85 weight percent of the first SEEPS copolymer, and 15 weight percent of the second SEEPS copolymer, for a sum total of 100 weight percent.

The term "about", as it relates to the further description of molecular weight, is intended to refer to values that are within 5,000 of the stated value. Accordingly, a weight average molecular weight of "about 150,000" includes SEEPS copolymers having a weight average molecular weight between 145,000 and 155,000. As another example, a weight average molecular weight of "about 308,000" includes SEEPS copolymers having a weight average molecular weights between 303,000 and 313,000. With respect to styrenic content, the term "about" is intended to refer to values that are within 2 units of their stated values. Accordingly, the first SEEPS copolymer having a stated styrenic content of about 30% may vary between 28% and 32%, and the second SEEPS copolymer having a stated styrenic content of about 32% may vary between 30% and 34%.

The term "polymer blend", as defined herein with respect to the elastomeric composition, refers to all of the SEEPS copolymers present in the elastomeric composition. In certain embodiments, the "polymer blend" is the first and second SEEPS polymers as described above, and does not include additional SEEPS polymers. The polymer blend does not refer to other components of the elastomeric composition, including other polymers that are different from SEEPS and that may be present in the elastomeric composition such as mineral oil, described below. Although not required, typically the elastomeric composition does not include polymers other than the polymers present in the polymer blend. In other words, typically, the only polymers present in the elastomeric composition are included in the polymer blend with the polymer blend consisting of the first and second SEEPS copolymers.

Referring still to the elastomeric composition, the elastomeric composition may also include an extender, e.g. mineral oil, which is combined with the polymer blend to provide a desired combination of melt viscosity and processing temperatures for the elastomeric composition when forming the patient support. The polymer blend of SEEPS has sufficient hydrogenation to provide Van der Waals interaction forces to maintain the oil/polymer blend matrix. In addition to aiding in processing, the mineral oil is added in amounts sufficient to provide the elastomeric composition, (e.g. the formed mattress or the cells 70 described below), with the desired combination of mechanical properties in terms of indentation force deflection (IFD), compression set (as measured by ASTM D0395-16), elongation (as measured by ASTM D412-16), and droop resistance (see below). Such properties of the resultant elastomeric composition will be described in further detail below.

In certain embodiments, the amount of mineral oil in the elastomeric composition is included at an oil/polymer weight ratio range of from 1.75:1 to 3.0:1, such as from 2.5:1 to 2.9:1, such as from 2.6:1 to 2.8:1, such as from 2.7 to 2.75:1.

In certain embodiments, the combination of the polymer blend and mineral oil in the elastomeric composition is present in an amount of at least 85 percent by weight based on the total weight of the elastomeric composition. Alternatively, the combination of the polymer blend and mineral oil elastomeric composition may include the polymer blend in an amount of from 85 to 100, from 88 to 100, from 91 to 100, from 94, to 100, from 97 to 100, or about 98, or about 99, weight percent based on the total weight of the elastomeric composition.

In addition, various additives could be included in the elastomeric composition that provide various combinations of desired properties, in combination with the polymer blend and the mineral oil, to the elastomeric composition and the patient support. Such additives include, but are not limited to, colorants (such as pigments or dyes), extenders, fillers, flame retardants, plasticizers other than mineral oil, microspheres, antioxidants, UV stabilizers, flow control agents, and the like, and combinations thereof. Such additives may be included in relatively small amounts, such as from 0.1 to 2 weight percent, or such as 1 percent, based on the total weight of the elastomeric composition.

As noted above, the elastomeric composition may be processed to form the patient support. In particular, the elastomeric composition may be processed by extrusion, or injection molding (including multi-stage injection molding), or other known processes, to produce the patient support. In other words, the aforementioned processing techniques may be used to shape the elastomeric composition to a desired geometry thus forming the resulting patient support.

As briefly referenced above, in certain embodiments, the elastomeric composition may be used in a medical setting to form the patient support, such as the patient support 32 shown in FIGS. 1-5 and 7-10. Alternatively, the elastomeric composition may be used in a non-medical setting to support a person.

FIG. 1 illustrates a patient support apparatus 30 including the patient support 32 in accordance with an exemplary embodiment of the present disclosure. The patient support apparatus 30 shown in FIG. 1 is a hospital bed, but alternatively may be a stretcher, cot, trolley, gurney, wheelchair, recliner, chair, table, or other suitable support or transport apparatus. The patient support apparatus 30 may include a base 34 having wheels 36 adapted to rest upon a floor surface, and a patient support deck 38 supported by the base 34. The illustrated embodiment shows the wheels 36 as casters configured to rotate and swivel relative to the base 34 during transport with each of the wheels 36 disposed at or near an end of the base 34. In some embodiments, the wheels 36 may be non-steerable, steerable, non-powered, powered, or combinations thereof. For example, the patient support apparatus 30 may comprise four non-powered, non-steerable wheels, along with one or more additional powered wheels. The present disclosure also contemplates that the patient support apparatus 30 may not include wheels.

The patient support apparatus 30 may include an intermediate frame 40 spaced above the base 34 with the patient support deck 38 coupled to or disposed on the intermediate frame 40. A lift device 42 may be operably coupled to the intermediate frame 40 and the base 34 for moving the patient support deck 38 relative to the base 34. In the exemplary embodiment illustrated in FIG. 1, the lift device 42 includes a pair of linear actuators 44, but other suitable constructions are contemplated. The illustrated embodiment also shows the patient support deck 38 including articulating sections 46 configured to articulate the patient support 32 between various configurations. The articulating sections 46 may include a fowler section 46A, a seat section 46B, a thigh section 46C, a leg section 46D, and the like, operably coupled to actuators 48. For example, the actuators 48 may move the fowler section 46A between a first position in which the patient P is supine, as illustrated in FIG. 1, and a second position in which the torso of the patient P is positioned at an incline. For another example, a gatch maneuver may be performed in which the positions of the thigh and/or leg sections 46C, 46D are articulated to impart flexion or extension to lower extremities of the patient.

The patient support 32 is supported on the patient support deck 38 of the patient support apparatus 30. The illustrated embodiment shows the patient support 32 as a mattress for supporting the patient P when positioned on the patient support apparatus 30. The patient support 32 includes a crib assembly 50 to be described in detail, and in certain embodiments a cover assembly 52 within which the crib assembly 50 is disposed.

Figure 2:
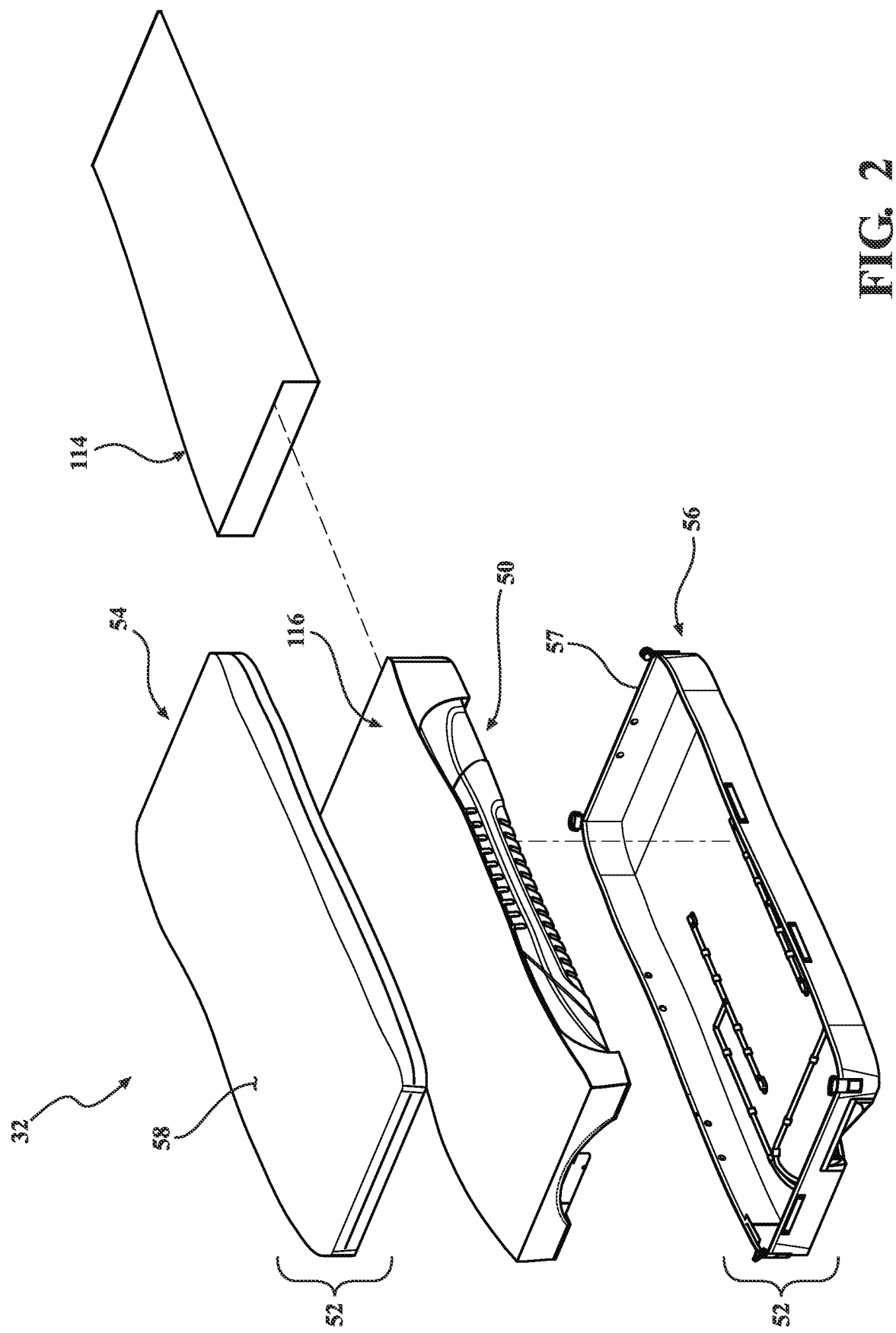
FIG. 2 is an exploded view illustrating a crib assembly, spacer layer, and a cover assembly.
Figure 3:
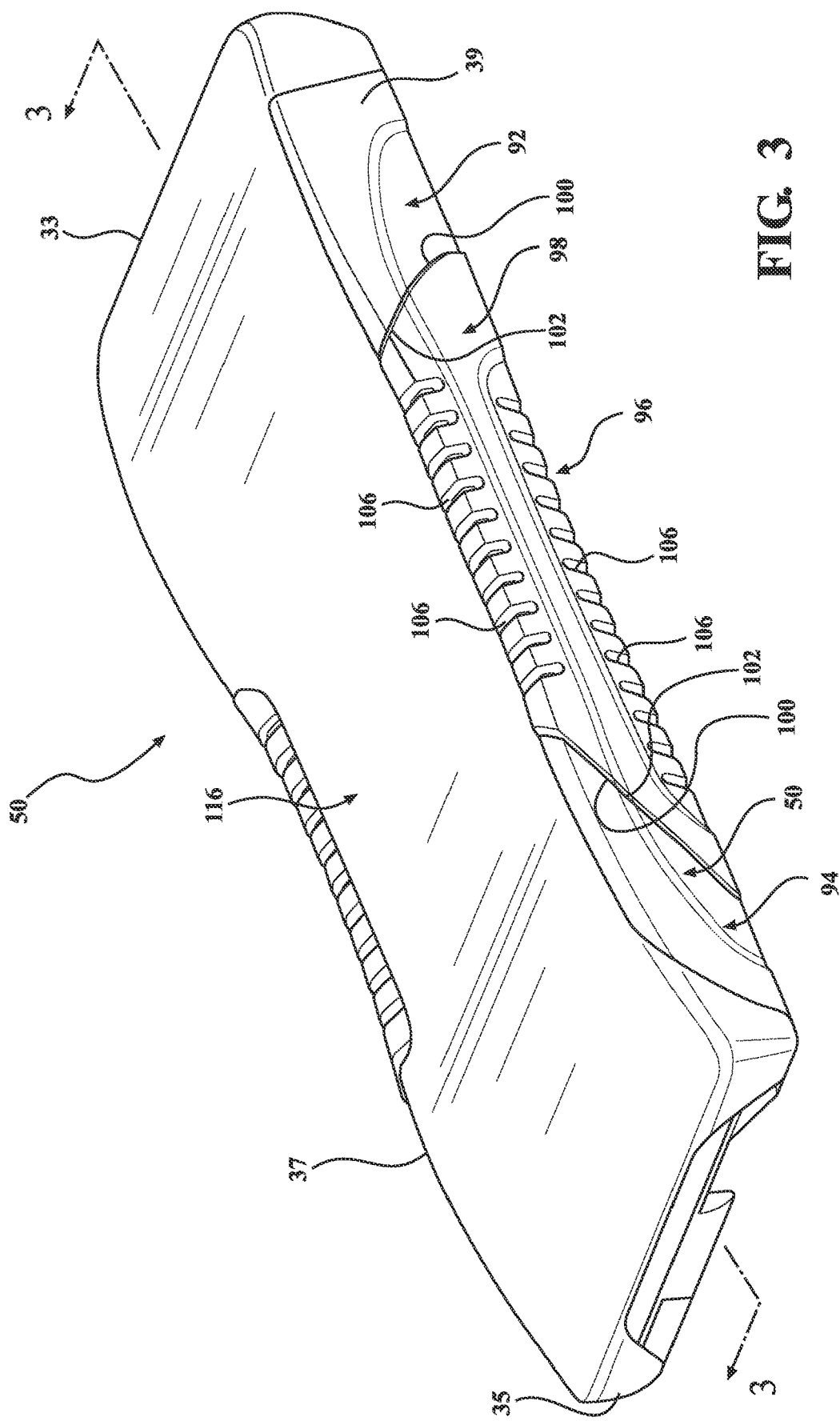
FIG. 3 is a perspective view of the crib assembly and the spacer layer.

Referring to FIG. 2, the cover assembly 52 may include a top cover 54 opposite a bottom cover assembly 56 that cooperate to define an interior sized to receive the crib assembly 50. In certain embodiments, the cover assembly 52 may include a fastening device 57 (see also FIG. 6) for coupling the top cover 54 and the bottom cover assembly 56. In one example, the fastening device 57 is a zipper extending about sides of the cover assembly 52. Other fastening devices may include snaps, clips, tethers, hook and eye connections, adhesive, and the like. In one variant, the top cover 54 and the bottom cover assembly 56 are integrally formed to provide the cover assembly 52 of unitary structure that is not removable from the crib assembly 50. A watershed (not shown) may be coupled to the top cover 54 and/or the bottom cover assembly 56 near the fastening device 57 to prevent ingress of fluid and other substances through the fastening device 57 to within the patient support 32. The crib assembly 50 disposed within the cover assembly 52 may be substantially encased within the cover assembly 52 to define the patient support 32. As shown in FIG. 3, the crib assembly 50 includes a head end 33 opposite a foot end 35 separated by opposing sides 37, 39.

The patient support 32 defines a patient support surface 58 (FIG. 2) for supporting the patient P. Absent bedding and the like, the patient P may be considered in direct contact with the patient support surface 58 when situated on the patient support 32. Referring now to FIGS. 1 and 2, the patient support surface 58 may be considered an upper surface of the top cover 54 of the cover assembly 52. In a variant without the cover assembly 52, the patient support surface 58 may be considered an upper surface of the crib assembly 50. The patient support surface 58 is sized to support at least a majority of the patient P. Furthermore, during movement therapy to be described, the patient support surface 58 is moved relative to other structures of the patient support 32 and the patient support apparatus 30.

Certain aspects of the crib assembly 50 will now be described with reference to FIGS. 4 and 5. The crib assembly 50, in a most general sense, provides the internal structure of the patient support 32 for supporting and cushioning the patient P on the patient support surface 58. The crib assembly 50 includes at least one, and in the illustrated embodiment more than one, conformable layers to resiliently deform when supporting the weight of the patient P. FIG. 5 shows the crib assembly 50 including an upper conformable layer 60 and a lower conformable layer 62. The upper conformable layer 60 may include a first section 64, a second section 65, and a third section 66 positioned along a length of the crib assembly 50 from the head end 33 to the foot end 35. The first, second, and third sections 64-66 may be arranged (e.g., positioned adjacent to one another) such that the upper conformable layer 60 is disposed beneath at least a majority of the patient support surface 58. In other words, the first section 64 may be disposed near the head end 33 and configured to support at least a portion of the upper body of the patient P, the third section 66 may be disposed near the foot end 34 and positioned to support at least a portion of the lower body of the patient P, and the second section 65 may be disposed between the first and third sections 64, 66 and positioned to support at least a portion of the upper and/or lower body of the patient P. More specifically, the second section 65 may be positioned to support the sacrum, buttocks, and thighs of the patient P, and includes features to be described that accommodate the increased focal pressures often experienced by the patient P in these anatomical areas.

In certain embodiments, the first, second, and/or third sections 64-66 of the upper conformable layer 60 may each include a lattice 68 of cells 70 to be described in greater detail. The lattices 68 of cells 70 may be integrally formed or separately formed lattices 68 that are connected together. Each lattice 68 of cells 70 may be formed of the elastomeric composition as described above. FIG. 5 shows the first, second, and third sections 64-66 including a head lattice, a torso lattice, and a foot lattice, respectively, with the lattices 68 of an adjacent two of the first, second, and third sections 64-66 positioned in an interlocking arrangement (e.g., a hexagonal tessellation to be described). In other words, the cells 70 at one end of the head lattice 68 are staggered to provide a zig-zag end, and the cells 70 at a complementary end of the torso lattice 68 are staggered to provide a complementary zig-zag end. Likewise, the cells 70 at the other end of the torso lattice 68 are staggered to provide a zig-zag end, and the cells 70 at a complementary end of the foot lattice 68 are staggered to provide a complementary zig-zag end. The complementary zig-zags are positioned in abutting relationship to provide the interlocking arrangement such that, when assembled, the lattices 68 of the first, second, and third sections 64-66 appear integrally formed or continuous.

Figure 4:
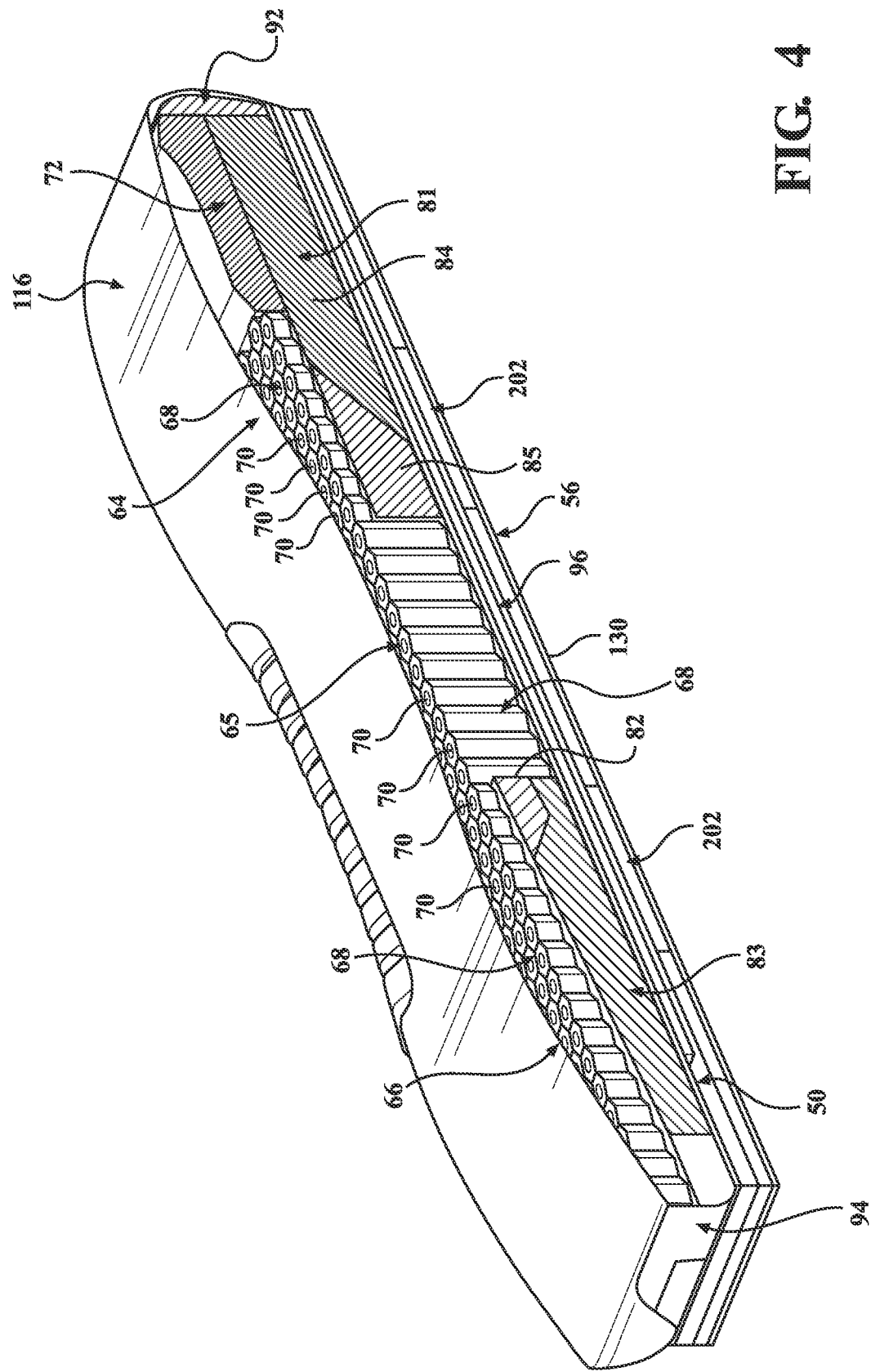
FIG. 4 is a cross-sectional view of the crib assembly and the spacer layer.
Figure 5:
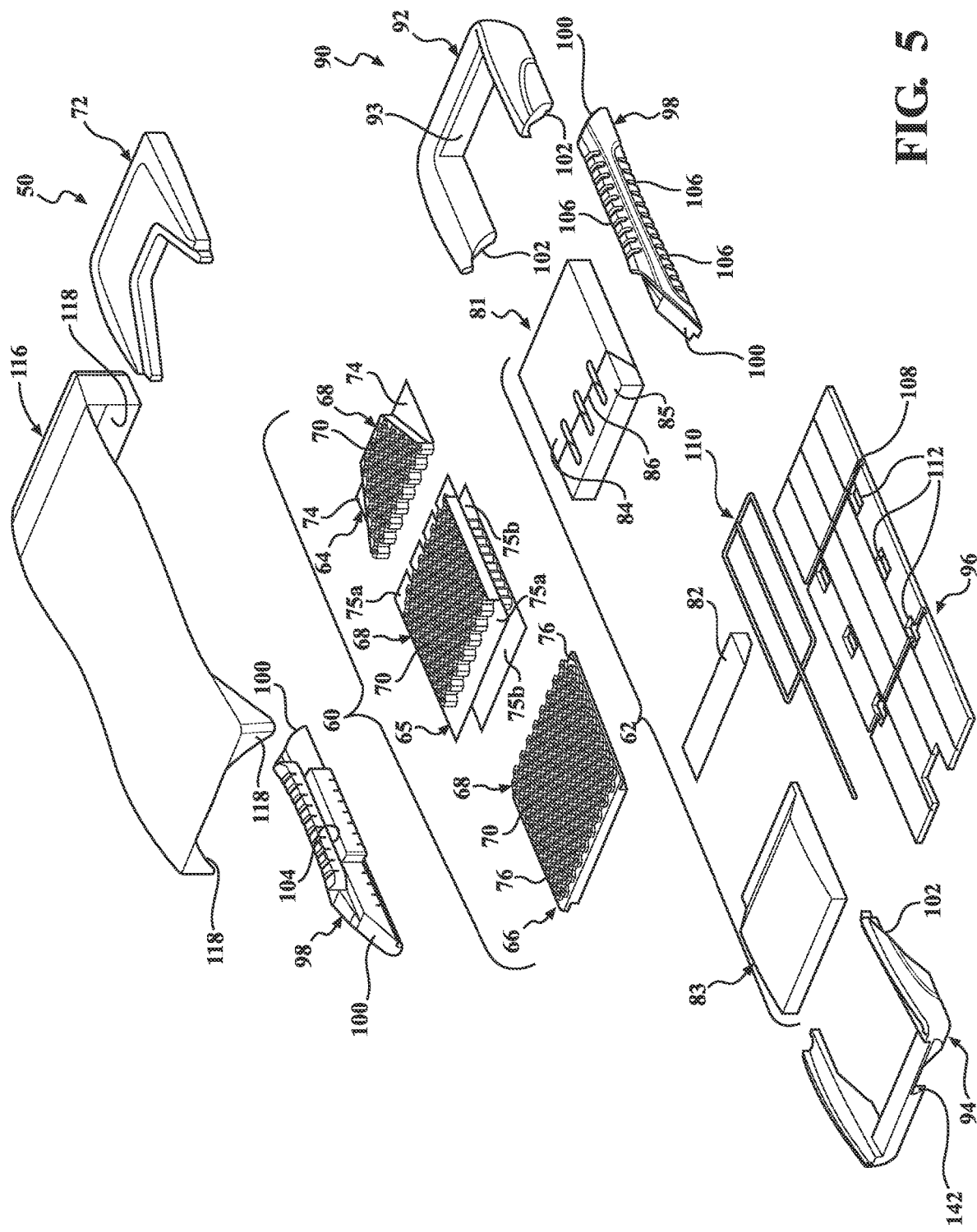
FIG. 5 is an exploded view of the crib assembly and the spacer layer.

With continued reference to FIGS. 4 and 5, the lattice 68 of the first section 64 may include a taper such that the lattice 68 appears generally trapezoidal in shape when viewed in plan. The taper is shaped to accommodate a head end support 72 of the crib assembly 50. In particular, the head end support 72 may be generally U-shaped in construction with opposing legs of the head end support 72 being shaped complementarily to the taper of the lattice 68 of the first section 64. The first section 64 may include coupling features 74 (described further below) extending outwardly from the legs of the trapezoidal-shaped lattice 68 such that the first section 64 appears rectangular when viewed in plan. The coupling features 74 are configured to be coupled with an underside of the legs of the head end support 72 by a suitable joining means, for example an adhesive. A thickness of an end of the head end support 72 adjacent the first section 64 may be approximate a thickness of the lattice 68 of the first section 64 such that, when the head end support 72 and the first section 64 are coupled together, a contoured surface is provided. It is understood from FIGS. 4 and 5 that the head end support 72 may be further contoured in a manner to support the head of the patient P. In certain embodiments, the head end support 72 may be formed from material(s) with less conformability relative to that of the lattice 68 of the first section 64 to accommodate the distinct considerations of supporting the head of the patient P on the patient support 32. Of course, the head end support 72 may also be formed from the same elastomeric composition used to form the lattice 68.

The second section 65 of the upper conformable layer 60 may include the lattice 68 that is generally rectangular in shape when viewed in plan. The second section 65 may include coupling features 75a, 75b extending outwardly from the rectangular-shaped lattice 68. The coupling features include upper coupling features 75a, and lower coupling features 75b to be described. The upper coupling features 75a on one end of the second section 65 are configured to be coupled with an underside of the first section 64 by a suitable joining means, for example an adhesive, when the head lattice and the torso lattice are positioned in the interlocking arrangement previously described. Likewise, upper coupling features 75a on the other end of the second section 65 are configured to be coupled with an underside of the third section 66 with a suitable joining means, for example an adhesive, when the torso lattice and the foot lattice are positioned in the interlocking arrangement previously described. As best shown in FIG. 4, a thickness of the lattice 68 of the second section 65 may be greater than each of the lattices 68 of the first and third sections 64, 66. The increased thickness of the torso lattice, among other advantages, accommodates the increased focal pressures often experienced by the patient P in the anatomical areas mentioned.

The lower conformable layer 62 may include a first section 81, a second section 82, and a third section 83. The first, second, and/or third sections 81-83 of the lower conformable layer 62 may be formed from foam-based material(s) and/or other suitable material(s). The material(s) comprising the first, second, and/or third sections 81-83 may be less conformable relative to that of the lattices 68 of the first, second, and/or third sections 64-66, as it is appreciated that cushioning demands of the lower conformable layer 62 may be relatively less than that of the upper conformable layer 60. The first section 81 may be at least partially positioned beneath at least one of the head end support 72 and the first section 64 of the upper conformable layer 60. In other words, an underside of the head end support 72 and/or the first section 64 is supported upon an upper surface of the first section 81. The first section 81 may include a first portion 84 and a second portion 85 coupled to one another at a joint 86.

As mentioned, the thickness of the lattice 68 of the second section 65 may be greater than the thickness of each of the lattices 68 of the first and third sections 64, 66. With continued reference to FIGS. 4 and 5, an end of the first section 81 of the lower conformable layer 62 may be positioned adjacent a corresponding end of the second section 65 of the upper conformable layer 60. In certain locations of the second section 65, there may not be a structure of the lower conformable layer 62 positioned beneath the second section 65 of the upper conformable layer 60. The second section 82 of the lower conformable layer 62 is positioned adjacent another end of the second section 65 of the upper conformable layer 60 opposite the first section 81, as best shown in FIG. 4. The second section 82 of the lower conformable layer 62 may further be at least partially positioned beneath the third section 66 of the upper conformable layer 60. In other words, an underside of the third section 66 is supported on an upper surface of the second section 82.

The third section 83 of the lower conformable layer 62 may be positioned adjacent the second section 82. The third section 83 may be at least partially positioned beneath at least one of the second and third sections 65, 66 of the upper conformable layer 62. In other words, an underside of the second section 65 and/or the third section 66 of the upper conformable layer 62 is supported upon an upper surface of the third section 83 of the lower conformable layer 62. With continued reference to FIGS. 4 and 5, each of the second and third sections 82, 83 of the lower conformable layer 62 may include complementarily inclined surfaces positioned in an abutting relationship.

As mentioned, the coupling features of the second section 65 may include the upper coupling features 75a previously described, and lower coupling features 75b. The lower coupling features 75b extend outwardly from the rectangular-shaped lattice 68 and are spaced apart from the upper coupling features 75a to define gaps therebetween. The lower coupling features 75b on one end of the second section 65 are configured to be coupled with an underside of the first section 81 by a suitable joining means, for example an adhesive, and the lower coupling features 75b on the other end of the second section 65 are configured to be coupled with an underside of the third section 83 by a suitable joining means, for example an adhesive. In such an arrangement, the gaps between the upper and lower coupling features 75a, 75b are sized to receive a thickness of the first section 81 and a combined thickness of the second and third sections 82, 83, as best shown in FIG. 4.

The upper conformable layer 60 and the lower conformable layer 62 are configured to be received in a cavity defined by a crib 90 of the crib assembly 50. In a most general sense, the crib 90 provides a framework of the patient support 32. In the illustrated embodiment, the crib 90 may include a head end frame member 92, a foot end frame member 94, a base layer 96, and side frame members 98 with each to be described in turn. The head end frame member 92 may be generally U-shaped in construction with the head end frame member 92 engaging the first section 81 of the lower conformable layer 62 on three sides. The head end frame member 92 may include a recess 93 sized to receive an end of the first section 81. Further, the generally U-shaped head end frame member 92 may at least partially engage the head end support 72 on three sides. In at least some respects, the head end frame member 92 may be considered the head end 33 of the crib assembly 50.

The foot end frame member 94 may be coupled to the upper and lower conformable layers 60, 62 opposite the head end frame member 92. The foot end frame member 94 may be coupled to an end of the third section 66 opposite the second section 65. FIG. 5 shows the foot end frame member 94 being generally U-shaped in construction so that the foot end frame member 94 engages the third section 66 on three sides. In particular, the third section 66 of the upper conformable layer 60 includes coupling features 76 extending from opposing sides of the lattice 68. The coupling features 76 are configured to be coupled with an upper surface of opposing legs of the generally U-shaped foot end frame member 94 by a suitable joining means, for example an adhesive. In at least some respects, the foot end frame member 94 may be considered the foot end 35 of the patient support 32.

Flanking the upper and lower conformable layers 60, 62 are the side frame members 98. The side frame members 98 are coupled to each of the head end frame member 92 and the foot end frame member 94. With concurrent reference to FIG. 3, the illustrated embodiment shows the side frame members 98 including inclined surfaces 100 matingly engaging complementary inclined surfaces 102 of each of the head end frame member 92 and the foot end frame member 94. Further, the side frame members 98 may be coupled to one or both of the upper and lower conformable layers 60, 62. FIG. 5 shows the side frame members 98 including an upper ledge 104 configured to receive the upper coupling features 75a extending from opposing sides of the second section 65 with a suitable joining means, for example an adhesive.

Referring to FIG. 5, the side frame members 98 may include slots 106 at least partially extending transversely through the side frame members 98 to define rib-like structures. The slots 106 may be provide for flexion of the side frame members 98 through relative articulation of the rib-like structures secondary to the material forming the side frame members 98. The slots 106 may further include upper and lower slots extending inwardly from upper and lower surfaces, respectively, of the side frame members 98.

The side frame members 98 coupled to each of the head end frame member 92 and the foot end frame member 94 may be considered to define a perimeter of the crib 90. The aforementioned cavity within which the upper and lower conformable layers 60, 62 are received is further defined by the base layer 96. Referring again to FIG. 5, the base layer 96 may be a planar structure to which each of the head end frame member 92, the foot end frame member 94, and the side frame members 98 are coupled. The base layer 96 is positioned beneath the lower conformable layer 62 such that an upper surface the base layer 96 may support the lower conformable layer 62. The base layer 96 may include at least one channel 108 sized to receive a first conduit assembly 110. The first conduit assembly 110 is configured to be in communication with a fluid source (not shown) to at least partially define a fluid flow path and circulate fluid from the fluid source, for example, air or conditioned fluid, through the fluid flow path to supply heat, remove heat, supply moisture, remove moisture, or the like, from the patient support surface 58. In other words, the first conduit assembly 110 circulating fluid may be utilized to control the conditions at or near an interface between the top cover 54 and the skin of the patient, to control the temperature and/or humidity at the interface. The base layer 96 may also define apertures 112 to accommodate structures of a patient turning system 200 to be described in greater detail. In certain embodiments, the crib assembly 50 includes a fire barrier layer 114 (see FIG. 2). Exemplary fire barrier layers suitable for the present application may be provided under the tradename NoMex (DuPont Company, Wilmington, Delaware), and under the tradename Integrity30 (Ventrex Inc., Ashburn, Virginia).

The patient support 32 may include a spacer layer 116 covering substantially an entirety of an upper surface of the crib assembly 50. More particularly, the spacer layer 116 covers the head end support 72 and the upper conformable layer 60. As best shown in FIG. 5, the spacer layer 116 may include coupling features 118 with the coupling features 118 at one end sized to receive the crib assembly 50, and more particularly the head end frame member 92. The coupling features 118 at the opposing end are configured to be coupled to the foot end frame member 94. The coupling features may be gusset-like features, such as elastic gussets conventionally provided on fitted sheets.

As previously mentioned, the top cover 54 is coupled to the bottom cover assembly 56, for example, with the fastening device 57. Components and features of the bottom cover assembly 56 will now be described with reference to FIG. 6. The bottom cover assembly 56 includes a carrier sheet 120. An upper surface of the carrier sheet 120 may be considered the structure in direct contact with an underside of the base layer 96 when the patient support 32 is assembled. At least one coupler 122 may be coupled to and extend from the upper surface of the carrier sheet 120. The couplers 122 are configured to secure a second conduit assembly 124 of the patient turning system 200 to be described. An underside of the base layer 96 may include additional channels (not shown) sized to receive the second conduit assembly 124 such that the underside of the base layer 96 and the upper surface of the carrier sheet 120 are in direct flat-on-flat contact. The carrier sheet 120 may include a base portion 126 and opposing sides 128 extending upwardly from the base portion 126. The fastening device 57 may be coupled to an upper edge of the opposing sides 128.

A bottom cover 130 may be coupled to the carrier sheet 120 to define a bottom of the patient support 32. In other words, an underside of the bottom cover 130 may be considered the surface in direct contact with the patient support deck 38 of the patient support apparatus 30 (see FIG. 1). The bottom cover 130 may include a head end section 132, a middle section 134, and a foot end section 136. The head end section 132, the middle section 134, and the foot end section 136 may be integrally formed or discrete components coupled to one another. The head end, middle, and foot end sections 132-136 collectively define a cavity sized to receive the carrier sheet 120, at least one patient turning device 202 of the patient turning system 200, and at least a portion of the crib assembly 50 previously described. In particular, an upstanding sidewall of each of the head end section 132 and the foot end section 136 may be arcuate and contoured to the head end frame member 92 and the foot end frame member 94, respectively, of the crib assembly 50. In the illustrated embodiment of FIG. 6, one or more handles 138 are coupled to head end, middle, and/or foot end sections 132-136 to assist caregivers with manipulating the patient support 32 when the patient support 32 is disposed on the patient support deck 38.

The foot end section 136 defines a recess 140 sized to receive a port connector 142. In short, the port connector 142 includes ports (not shown) configured to be in fluid communication with the aforementioned fluid source, and further configured to be in fluid communication with the first conduit assembly 110 and the second conduit assembly 124. The recess 140 of the foot end section 136 may be substantially aligned with a void between the gusset-like coupling features 118 coupled to the foot end frame member 94. The recess 140 of the foot end section 136 may also be substantially aligned with a complementary recess 141 defined within the foot end frame member 92, as shown in FIG. 5. The port connector 142 is positioned within the recesses 140, 141 so as to be accessible by caregivers positioned near the foot end 35 of the patient support 32.

The middle section 134 of the bottom cover 130 includes a base portion 144 and opposing sides 146 extending upwardly from the base portion 144. The fastening device 57 may be coupled to an upper edge of the opposing sides 146 (with or without also being coupled to the upper edge of the opposing sides 128 of the carrier sheet 120). With the carrier sheet 120 received within the middle section 134 of the bottom cover 130, the base portion 126 of the carrier sheet 120 is adjacent the base portion 144 of the bottom cover 130 (other than the presence of the patient turning devices 202), and the opposing sides 128 of the carrier sheet 120 are adjacent the opposing sides 146 of the bottom cover 130. The base portion 144 and/or opposing sides 146 of the bottom cover 130 may define an augmenting feature 148. In short, because the patient turning devices 202 are positioned external to the crib assembly 50 yet within the bottom cover assembly 56, the augmenting features 148 accommodate the expansion of the patient turning devices 202 and prevent "hammocking" of the patient support surface 58 during the movement therapy (i.e., localized alteration or stretching of the patient support surface 58 to a generally concave or arcuate contour that results in localized pressure points). For example, the augmenting features 148 may include the opposing sides 146 of the bottom cover 130 to be at least partially formed from Neoprene and/or other suitably elastic material(s), such as the elastomeric composition.

Figure 6:
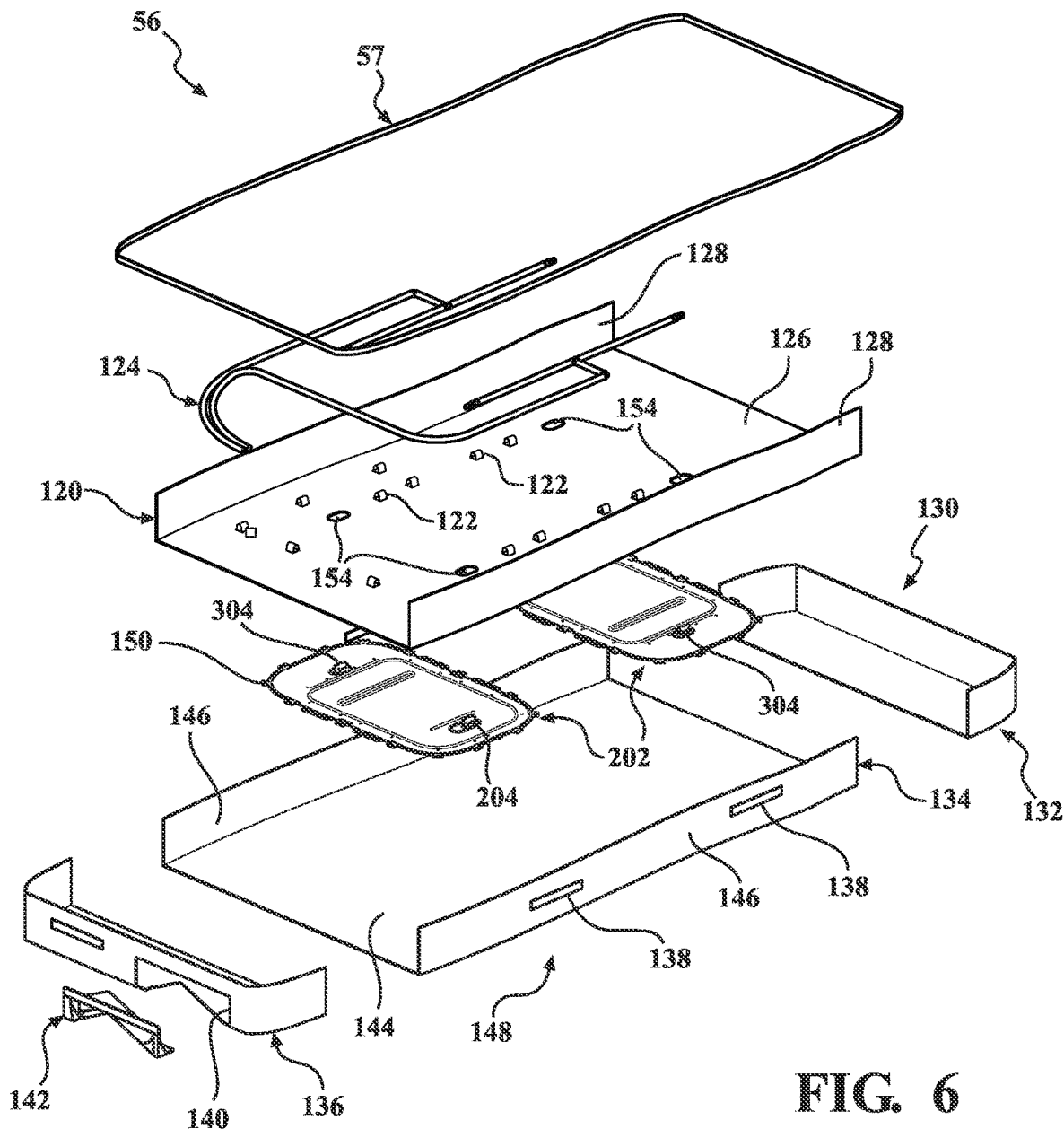
FIG. 6 is an exploded view of a bottom cover assembly.

With continued reference to FIG. 6 and concurrent reference to FIG. 4, the patient support 32 includes at least one of the patient turning devices 202 for moving the patient support surface 58, for example, during the movement therapy. The patient turning devices 202 are positioned between the carrier sheet 120 and the bottom cover 130. More particularly, the patient turning devices 202 are coupled to an underside of the carrier sheet 120 and may not be coupled to the bottom cover 130. The patient turning devices 202 include at least one inlet port 204, 206 configured to be arranged in fluid communication with the second conduit assembly 124, the ports (not shown) of the port connector 142, and the fluid source. The carrier sheet 120 includes at least one aperture 154 sized and positioned such that, when the patient turning devices 202 are coupled to the carrier sheet 120, the inlet ports 204, 206 extend through the apertures 154. In manners to be described, at least one of the patient turning devices 202 is configured to be selectively inflated and deflated in order to move at least a portion of the patient support surface 58 away from or towards the patient support deck 38, respectively.

Figure 7:
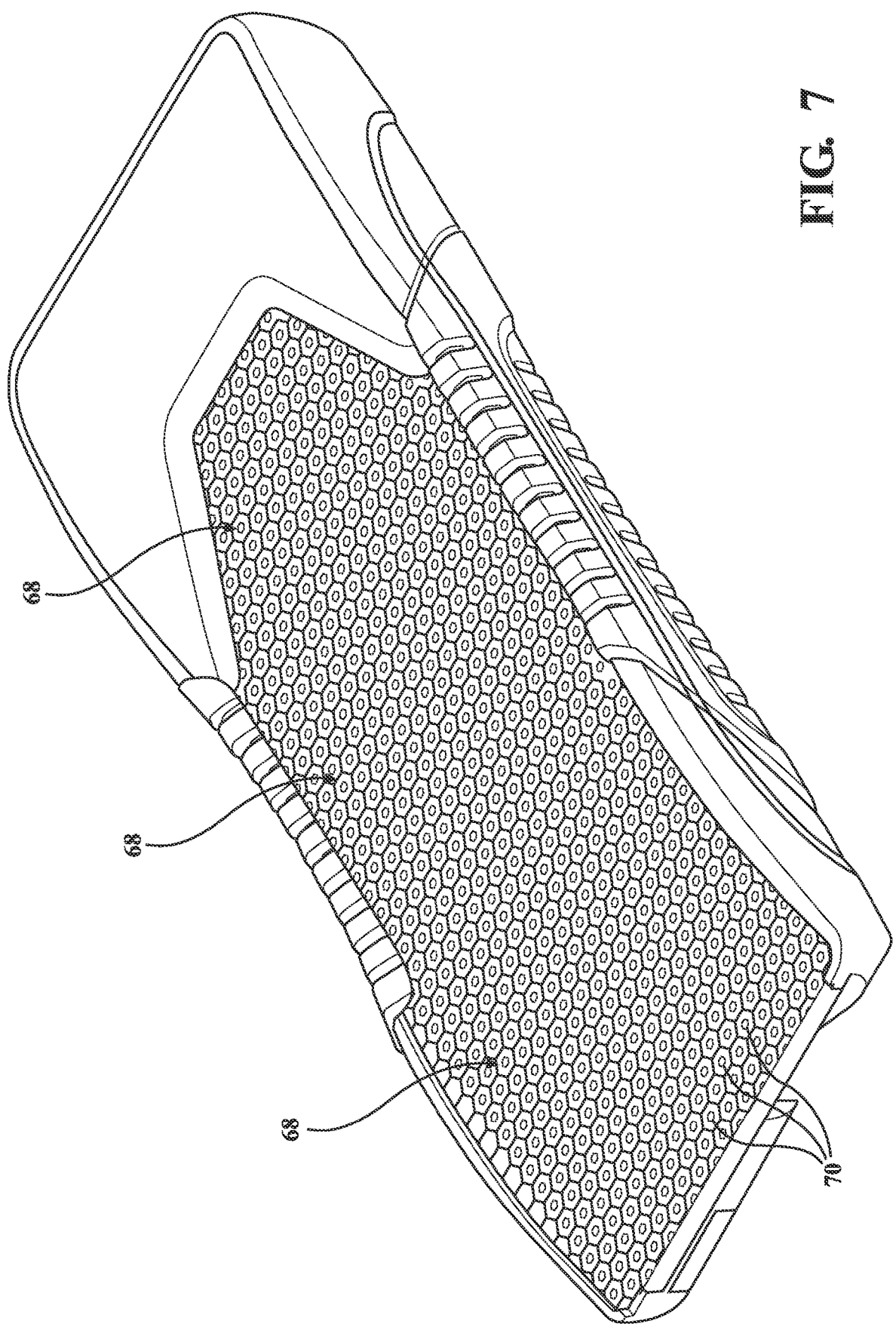
FIG. 7 is a perspective view of the crib assembly illustrating lattices of cells for supporting a patient.

Referring to FIG. 7, the crib assembly 50 is shown, including each lattice 68 of cells 70. In other versions, the crib assembly 50 may comprise one integrally formed lattice of cells, instead of separately formed lattices 68 that are connected together. In the embodiment shown, as described above, three separate lattices 68 are provided (see FIG. 5) including the head lattice, the torso lattice, and the foot lattice. One objective of forming the lattices 68 with the elastomeric composition is to minimize the occurrence of pressure sores/ulcers by providing uniform pressure support for a range of patient weights. It is to be appreciated the uniform pressure support is established by the combination of the elastomeric composition and the particular geometry of the lattices 68 formed therefrom.

Figure 8:
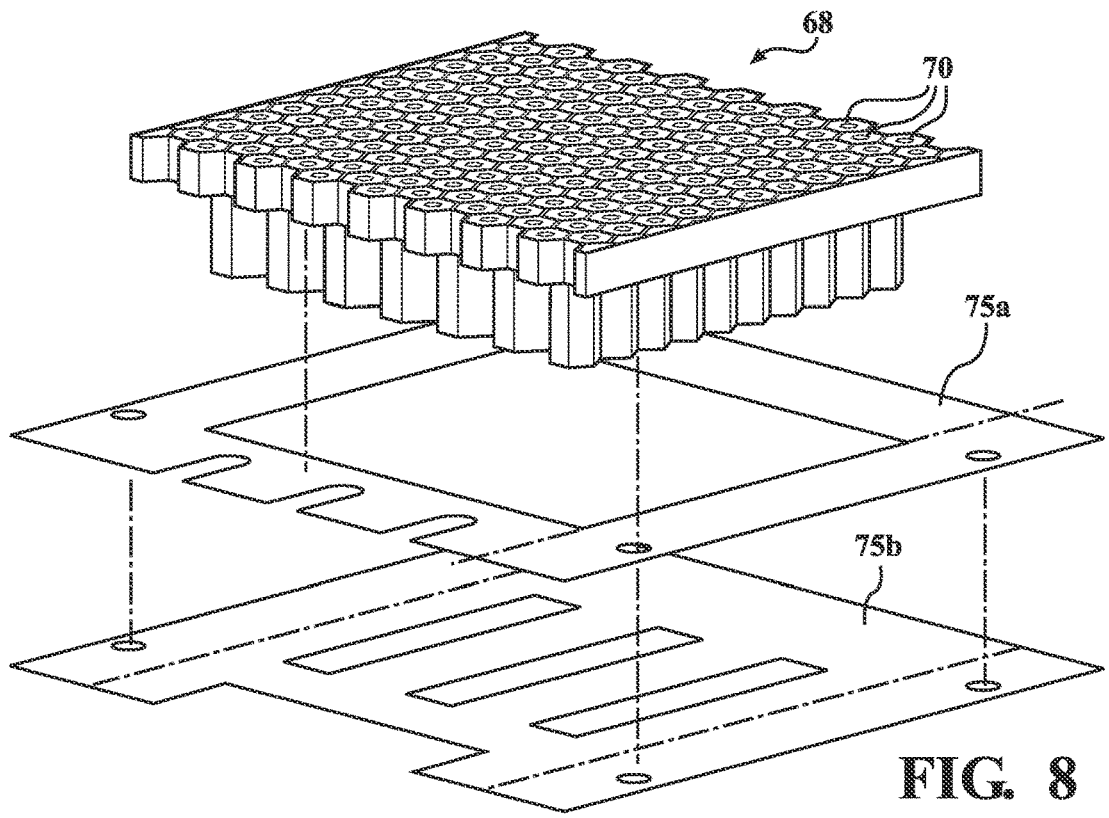
FIG. 8 is an exploded and perspective view of a lattice of cells illustrating coupling features used to connect the lattice of cells to a crib of the crib assembly.
Figure 9:
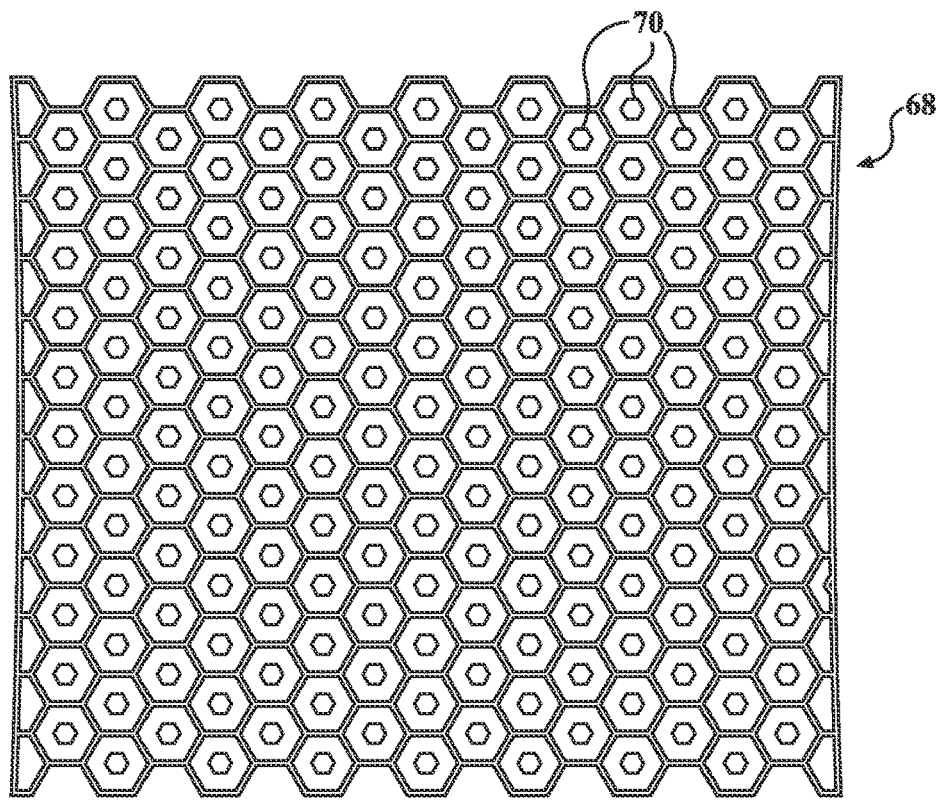
FIG. 9 is a top view of the lattice of cells from FIG. 8.
Figure 10:
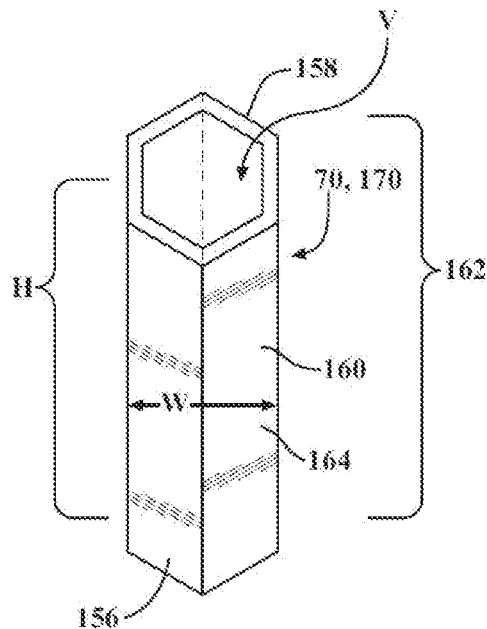
FIG. 10 is a perspective view of a cell formed as a hexagonal shaped column.

Referring to FIGS. 8-10, each lattice 68 of cells 70 is not particularly limited in size or configuration. For example, the lattice 68 itself may have a periphery that is configured in any shape including rectangular, trapezoidal, square, or in any other shape. Moreover, the lattice 68 may be of any length, width, and depth. The cells 70 themselves are also not particularly limited in size, shape, or configuration. The cells 70 may be shaped as a triangle, square, rectangle, pentagon, hexagon, etc. In FIG. 10, the cell 70 is shaped as a hexagon, referred to as hexagonal cell 170. In another embodiment (not shown), the cell 70 is shaped as a triangle, referred to as a triangular cell. The cells 70 may be all of the same shape and size or may be of differing shapes and/or sizes. For example, some of the cells 70 may be hexagonal while others may have four sides. Further, the cells 70 of the lattice 68 may fit together laterally and/or longitudinally in a complementary pattern or may be offset from one another.

In some embodiments, the cells 70 are disposed in the crib 90 so that no other cells are disposed between the cells 70 and the bottom of the crib 90 or between the cells and the top cover 54. In one words, in some embodiments, the lattices 68 are arranged in the crib 90 so that no lattice is stacked on top of another lattice, i.e., only a single layer of cells 70 is present within the cover assembly 52, between the top and bottom layers of the cover. In some embodiments, the lattices 68 are arranged so that at least one lattice (e.g., the torso lattice) has no other lattices stacked above or below it, but adjacent lattices, such as the head and/or foot lattices, may have other lattices stacked thereon or thereunder. It should be appreciated, however, that other layers, such as the coupling features 74, 75a, 75b, may be present between the cells 70 and the bottom of the crib 90 or between the cells 70 and the top cover 54.

Referring back to FIG. 10, each of the cells 70 includes a base 156 and extends to a top 158 opposite the base 156. Each of the cells 70 has three or more walls 164, shown in FIG. 10 as six walls 164, having a thickness and extending from the base 156 to the top 158 to form a column 162 having a height H and width W that defines an interior volume (V) within a perimeter of the three or more walls 164. Accordingly, the cells 70 with six walls 164 in FIG. 10 may further be defined as hexagonal cells 170

The walls 164 may be singular or may include two individual walls spaced laterally from one another thereby defining a void therebetween. The void may remain empty or may be filled with any filler in the art. In certain embodiments, one or more of the walls 164 of the lattice of cells 70, 170 are further defined as buckling elements, which compress and then buckle under pressure, i.e., move laterally, so as to balance pressure exerted upwards on the patient. The buckling elements offer little resistance to deformation thereby reducing pressure on the patient.

The elastomeric composition (as formed from the polymer blend of the first and second SEEPS copolymers, mineral oil and additives as described above) may be processed by extrusion, or injection molding (see the Examples describing one injection molding method), or other known processes, to produce the patient support 32 including the cells 70, 170 of each lattice 68, as illustrated in FIGS. 1-5 and 7-10, or to otherwise form a support for a person.

Referring now to the physical properties of the elastomeric composition (as formed from the polymer blend of the first and second SEEPS copolymers, mineral oil and additives as described above), the cells 70, 170 used in the lattices 68 of the patient support 32 can be formed with a desired indentation force deflection (IFD). The IFD test is one of multiple test methods that are defined in ASTM D3574. Within ASTM D3574, the indentation force deflection procedure is Method B1 which measures the force (in pounds) required to indent an eight inch diameter steel plate (called an indentor foot) into a sample (here the formed elastomeric composition (such as the cells 70, 170), formed from the elastic compositions described above), to a stated percentage of the test sample's initial height which is commonly four inches. The IFD of the elastomeric composition is typically between 15 and 60 pounds of force as measured in accordance with ASTM D3574 B1, depending upon the part geometry wherein the part is compressed to approximately 50% of its thickness (e.g. to about 2 inches). In the cells 70, 170 particularly described in FIGS. 1-10 above (and including the elastomeric composition) for use in the patient support apparatus 30, the IFD of the cells 70, 170 is measured between 15 and 60 pounds of force, such as between 20 and 30 pounds of force, to compress the cell 70, 170 to about 50% of its thickness.

Still further, the elastomeric composition (as formed from the polymer blend of the first and second SEEPS copolymers, mineral oil and additives as described above) also provides acceptable mechanical properties in terms of average droop resistance, compression set and elongation characteristic (both prior to and after heat aging designed to simulate use), and thus further confirms its appropriateness for use in the cells 70, 170 used in the lattices 68 of the patient support 32. In fact, the elastomeric composition as described above provides similar compression set and elongation properties (measured in accordance with ASTM standards D0395-16 and D412-16, respectively) to elastomeric compositions in which Kraton® 1830 (a polymer having a hydrogenated midblock of styrene-ethylene/butylene-styrene (SEBS), available from Kraton Corporation) replaces the polymer blend described above at the same mineral oil/polymer ratio of 2.7-2.75:1.

EXAMPLES

Example 1: Preparation of Elastomeric Composition Molded Plaques

Elastomeric Compositions for evaluation in Examples 2 and 3 below were prepared under the following procedure.

First, formulation for forming the elastomeric compositions evaluated in Examples 2 and 3 are provided in Table 1:

TABLE 1

Elastomeric Compositions for Evaluation

| Component | Component Description | Weight | Weight Percent of Total |
|---|---|---|---|
| 1 | Polymer Blend[1] | 10 g | 26.4% |
| 2 | Mineral Oil | 27.5 g | 72.56% |
| 3 | Stabilizers[2] | 0.3 g | 0.8% |
| 4 | Colorant[3] | 0.1 g | 0.26% |
| Total | | 37.9 g | 100% |

[1]Blend of First SEEPS copolymer (Mw (weight average) about 308,000, styrenic content about 30%) and Second SEEPS copolymer (Mw (weight average) of about 150,000, styrenic content about 32%).
[2]Evernox 1010 (antioxidant) and Everfos 168 (phosphite processing aid), stabilizers commercially available from Everspring Chemical Co., Ltd of Taichung, Taiwan.
[3]Sunfast blue pigment available from Sun Chemical Corporation of Parsippany, New Jersey.

In Table 1, the weight ratio of the First SEEPS copolymer to the second SEEPS copolymer was varied between 100:0 and 10:90 (i.e., 100% of the First SEEPS copolymer to a blend of 10% by weight of the first SEEPS copolymer and 90% of the second SEEPS copolymer).

To form the elastomeric composition, components 1, 2 and 4 were first dry blended until uniformly distributed into a dry mixture. Component 2 was added to the dry mixture and mixed to form the elastomeric composition having a polymer/polymer blend to mineral oil weight ratio of 2.75:1.

The elastomeric composition was then introduced into a multi-stage injection molding machine including multiple temperature zones set at varying temperatures (and typically increasing temperatures), with the molded part ejected at the nozzle end after traversing the multiple temperature zones. The elastomeric composition was then molded into molded test plaques, which were removed from the Toshiba machine, with the plaques evaluated for packout, clarity, bubbles, waviness, fractures, snake skin and the like. Minor adjustments to temperature profiles, screw speed, or polymer/polymer blend to mineral oil weight ratio, as needed, were performed as needed for each representative elastomeric composition to ensure that the molded test plaques had similar properties in terms of packout, clarity, bubbles, waviness, fractures, snake skin and the like. The molded test plaques were then available for use in the evaluations described in Examples 2 and 3 below.

Example 2: Average Droop Resistance Testing for Various Blends of the First and Second SEEPS Copolymers Molded test plaques of the elastomeric composition were prepared in accordance with the method described in Example 1, in which the weight ratio of the first and second SEEPS copolymer was varied between 100:0 and 10:90.

Sample test plaques of about 5 inches wide by 5.75 inches long (about 14.6 cm by 12.7 cm) having a thickness of about ⅛ inch (about 0.3 cm) were then die cut from the molded test plaques. These sample test plaques were then conditioned in an undeflected and undistorted state at ambient temperature and humidity for at least 12 hours before testing. Initial IFD measurements for the test plaques were measured at 50% compression in accordance with ASTM D3574 B1.

A first end of each of the plaques was then coupled to a vertical member, with the opposite open second end extending horizontally away from the vertical member. One half of the test plaques for each representative sample were then subjected to a load of 0.17 pounds per square inch (about 1.17 kilopascals) directed downward on the top of the plaque at a position corresponding to the open second end, while the remaining test plaques received no load. The test plaques were placed in an oven at about 60 (+/−2) degrees Celsius for approximately 36 hours.

Figure 11:
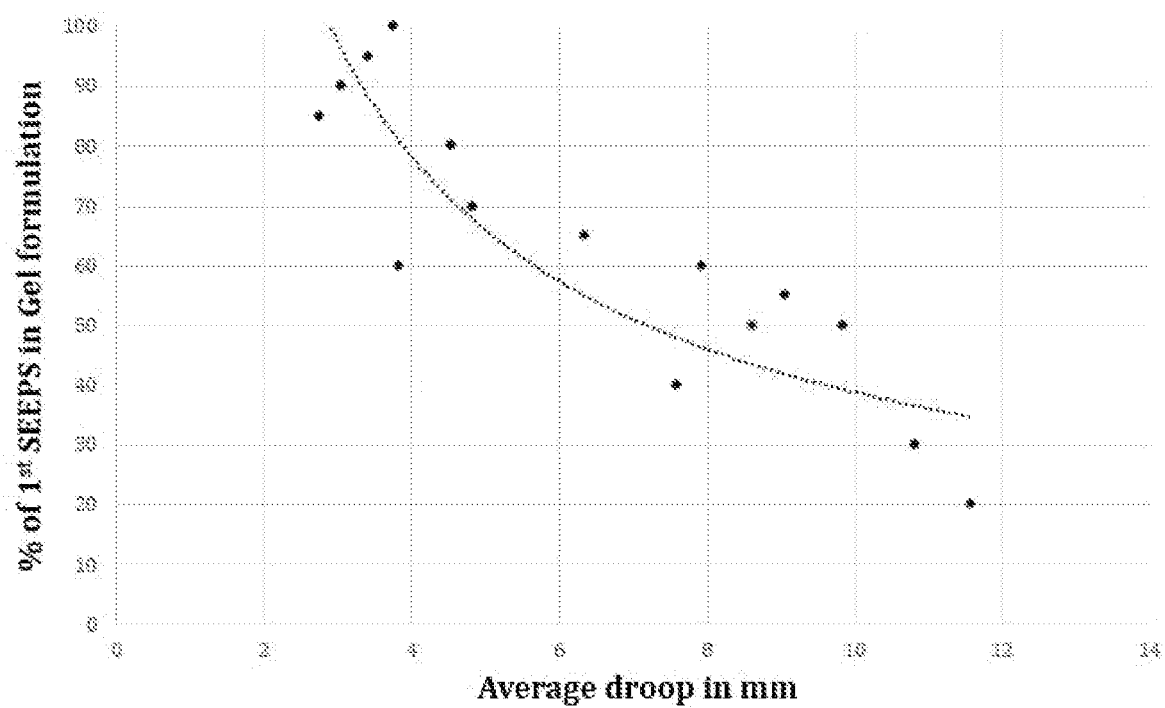
FIG. 11 is a graph comparing average droop for test plaques of elastomeric compositions having varying ratios of a first and second SEEPS copolymer.

The samples were removed from the oven and maintained in ambient conditions and ambient humidity for 12 hours. At this point, the unloaded samples were retested to confirm that the IFD measurement remained essentially constant to the IFD measurements performed before heat aging. In addition, the loaded test plaques were measured for droop resistance (i.e., deflection downward measured in millimeters relative to horizontal) relative to horizontal at the open second end. The droop for each representative loaded plaque was measured. The average droop results of multiple test plaques measured for each representative polymer blend, illustrated in FIG. 11, confirms generally that samples having higher amounts of the first SEEPS copolymer relative to the second SEEPS copolymer exhibited the lowest droop. Further, FIG. 11 also surprisingly and unexpectedly confirms that the least droop occurred in the sample test plaques formed from an elastomeric composition having 85% by weight of the first SEEPS copolymer and 15% by weight of the second SEEPS copolymer.

Example 3: Compression Set and Elongation Testing of Samples at 80/20 or 90/10 Weight Ratio of the First SEEPS Copolymer to the Second SEEPS Copolymer after Heat Aging Additional evaluations of test plaque samples formed in Example 1 of the higher weight ratio samples (samples at 80:20 and 90:10 weight ratios) of the first SEEPS copolymer to second SEEPS copolymer were performed to determine compression set and percent elongation after heat aging. For comparison, a reference test material molded plaque was also formed in accordance with the procedure of Example 1 above and evaluated with the test plaque samples described above. The reference test material utilized Kraton® 1830 (a styrene-ethylene/butylene-styrene (SEBS) copolymer manufactured by Kraton Corporation) instead of the polymer blend of the first and second SEEPS copolymers in the elastomeric compositions.

With respect to compression set testing and percent elongation, test plaque samples were evaluated for percent decrease in size in accordance with ASTM test procedure D0395-16 (Standard Test Methods for Rubber Property—Compression Set) and D412-16 (Standard Test Methods for Vulcanized Rubber and Thermoplastic Elastomers—Tension). The results of this testing for multiple samples of each polymer blend or polymer, after heat aging at 72 hours, 144 hours, and 216 hours, respectively, are provided in Tables 2 and 3:

TABLE 2

ASTM test procedure D0395-16 - Measured as Percent Compression of Samples

| Test Plaque Description (Polymer Blend Weight Ratio of First SEEPS to Second SEEPS copolymer or Polymer) | 72 Hours | 144 Hours | 216 Hours |
|---|---|---|---|
| 80:20 | 25% | 28% | 33% |
| 90:10 | 24% | 27% | 32% |
| 100% Kraton ® 1830 | 22% | 25% | 31% |

TABLE 3

ASTM test procedure D412-16- Measured as Percent Elongation of Samples

| Test Plaque Description (Polymer Blend Weight Ratio of First SEEPS to Second SEEPS copolymer or Polymer) | 72 Hours | 144 Hours | 216 Hours |
|---|---|---|---|
| 80:20 | 4.8% | 5.5% | 5.0% |
| 90:10 | 2.6% | 4.0% | 4.4% |
| 100% Kraton ® 1830 | 5.9% | 6.7% | 6.9% |

Tables 2 and 3 confirm that the test sample plaques formed from elastomeric compositions having weight ratios of 80:20 and 90:10 of the first and second SEEPS copolymer generally performed comparably or better to test plaques formed from elastomeric compositions utilizing 100% Kraton® 1830 in place of the first and second SEEPS copolymer in the elastomeric composition.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. An elastomeric composition for use in a lattice of cells of a patient support, the elastomeric composition comprising a polymer blend, the polymer blend consisting essentially of:
   from 85 to 95% by weight of a first SEEPS copolymer having a weight average molecular weight of at least 200,000 g/mol;
   from 5 to 15% by weight of a second SEEPS copolymer having a weight average molecular weight ranging from 125,000 to 175,000 g/mol; and
   mineral oil present in a weight ratio of mineral oil to polymer blend from 2.7:1 to 2.75:1;
   wherein the sum of the first SEEPS copolymer and the second SEEPS copolymer in the polymer blend is 100 weight percent;
   wherein the elastomeric composition has an indention force deflection of from 20 to 30 pounds as measured in accordance with ASTM D3574 B1 when the elastomeric composition is compressed to about 50% of its initial thickness.

2. The elastomeric composition of claim 1 wherein the first SEEPS copolymer has a weight average molecular weight of from 295,000 g/mol to 315,000 g/mol.

3. The elastomeric composition of claim 1 wherein the first SEEPS copolymer has a weight average molecular weight of about 308,000 g/mol.

4. The elastomeric composition of claim 1 wherein the second SEEPS copolymer has a weight average molecular weight of about 150,000 g/mol.

5. The elastomeric composition of claim 3, wherein the second SEEPS copolymer has a weight average molecular weight of about 150,000 g/mol.

6. The elastomeric composition of claim 1, wherein the styrene content of the first SEEPS copolymer is about 30 wt. %.

7. The elastomeric composition of claim 1, wherein the styrene content of the second SEEPS copolymer is about 32 wt. %.

8. The elastomeric composition of claim 1, wherein the polymer blend consists essentially of 85% by weight of the first SEEPS copolymer and 15% by weight of the second SEEPS copolymer.

9. The elastomeric composition of claim 5, wherein the polymer blend consists essentially of 85% by weight of the first SEEPS copolymer and 15% by weight of the second SEEPS copolymer.

10. A patient support for supporting a patient, the patient support comprising:
    a crib assembly comprising a lattice of cells formed from an elastomeric composition, with the cells directly abutting adjacent cells, the elastomeric composition comprising a polymer blend, the polymer blend consisting essentially of:
    from 75 to 95% by weight of a first SEEPS copolymer having a weight average molecular weight of weight of at least 200,000 g/mol; and
    from 5 to 25% by weight of a second SEEPS copolymer having a weight average molecular weight ranging from 125,000 to 175,000 g/mol,
    wherein the sum of the first SEEPS copolymer and the second SEEPS copolymer in the polymer blend is 100 weight percent.

11. The patient support of claim 10, wherein the first SEEPS copolymer has a weight average molecular weight of about 308,000 g/mol and the second SEEPS copolymer has a weight average molecular weight of about 150,000 g/mol.

12. The patient support of claim 11, wherein the styrene content of the first SEEPS copolymer is about 30 wt. % and wherein the styrene content of the second SEEPS copolymer is about 32 wt. %.

13. The patient support of claim 12, wherein the polymer blend consists essentially of 85% by weight of the first SEEPS copolymer and 15% by weight of the second SEEPS copolymer.

14. The patient support of claim 12, wherein the elastomeric composition further comprises mineral oil, and wherein the weight ratio of mineral oil to polymer blend in the elastomeric composition ranges from 2.7:1 to 2.75:1.

15. The patient support of claim 12, wherein the elastomeric composition has an indention force deflection of from 15 to 60 pounds as measured in accordance with ASTM D3574 B1 when the elastomeric composition is compressed to about 50% of its initial thickness.

16. The patient support of claim 12, wherein each cell in the lattice of cells has an indention force deflection of from 20 to 30 pounds as measured in accordance with ASTM D3574 B1 when the cell is compressed to about 50% of its initial thickness.

17. A patient support for supporting a patient, the patient support comprising:
- a crib assembly comprising a lattice of cells formed from an elastomeric composition, with the cells directly abutting adjacent cells, the elastomeric composition comprising a polymer blend, the polymer blend consisting essentially of:
  - from 75 to 95% by weight of a first SEEPS copolymer; and
  - from 5 to 25% by weight of a second SEEPS copolymer having a weight average molecular weight at least 10,000 g/mol less than the first SEEPS copolymer,
  - wherein the sum of the first SEEPS copolymer and the second SEEPS copolymer in the polymer blend is 100 weight percent.

* * * * *